US 11,433,720 B2
(12) United States Patent
Beutin et al.

(10) Patent No.: US 11,433,720 B2
(45) Date of Patent: Sep. 6, 2022

(54) COUPLING CONTROL MODULE FOR A TRAILER COUPLING

(71) Applicant: WESTFALIA-AUTOMOTIVE GMBH, Rheda-Wiedenbrück (DE)

(72) Inventors: Jorg Beutin, Gutersloh (DE); Torsten Kranz, Geseke (DE); Nikolas Pascher, Gutersloh (DE)

(73) Assignee: WESTFALIA-AUTOMOTIVE GMBH

( * ) Notice: Subject to any disclaimer, the term of this patent is extended or adjusted under 35 U.S.C. 154(b) by 559 days.

(21) Appl. No.: 16/482,762

(22) PCT Filed: Feb. 2, 2018

(86) PCT No.: PCT/EP2018/052626
§ 371 (c)(1),
(2) Date: Aug. 1, 2019

(87) PCT Pub. No.: WO2018/149662
PCT Pub. Date: Aug. 23, 2018

(65) Prior Publication Data
US 2019/0351719 A1    Nov. 21, 2019

(30) Foreign Application Priority Data

Feb. 14, 2017   (DE) ......................... 102017102927.3
Dec. 11, 2017   (DE) ......................... 102017129455.4

(51) Int. Cl.
*B60D 1/06*         (2006.01)
*B60D 1/54*         (2006.01)
(Continued)

(52) U.S. Cl.
CPC ................ *B60D 1/06* (2013.01); *B60D 1/54* (2013.01); *B60D 1/62* (2013.01); *B60R 16/0231* (2013.01);
(Continued)

(58) Field of Classification Search
CPC ....................................................... B60D 1/06
See application file for complete search history.

(56) References Cited

U.S. PATENT DOCUMENTS 6,130,487 A * 10/2000 Bertalan ................ H05B 47/20
340/12.32
6,501,376 B2 * 12/2002 Dieckmann .............. B60D 1/62
340/475

(Continued)

FOREIGN PATENT DOCUMENTS

DE    202011100844    8/2011
DE    202011100493    2/2012
(Continued)

OTHER PUBLICATIONS

Patent Cooperation Treaty (PCT), International Search Report and Written Opinion for Application PCT/EP2018/052626 filed Feb. 2, 2018, dated May 14, 2018, International Searching Authority, EP.

*Primary Examiner* — Travis R Hunnings

(74) *Attorney, Agent, or Firm* — McDonald Hopkins LLC

(57) ABSTRACT

A coupling control module according to the invention, comprises the coupling control module designed to transmit at least one configuration bus message to the at least one motor vehicle bus module via the bus interface, wherein the configuration bus message contains a configuration identifier to be entered in configuration data of the motor vehicle bus module, wherein the configuration identifier is provided so that when the motor vehicle continues to be operated, at least one motor vehicle bus module can execute at least one function according to the existence of the trailer coupling (Continued)

Figure 1:
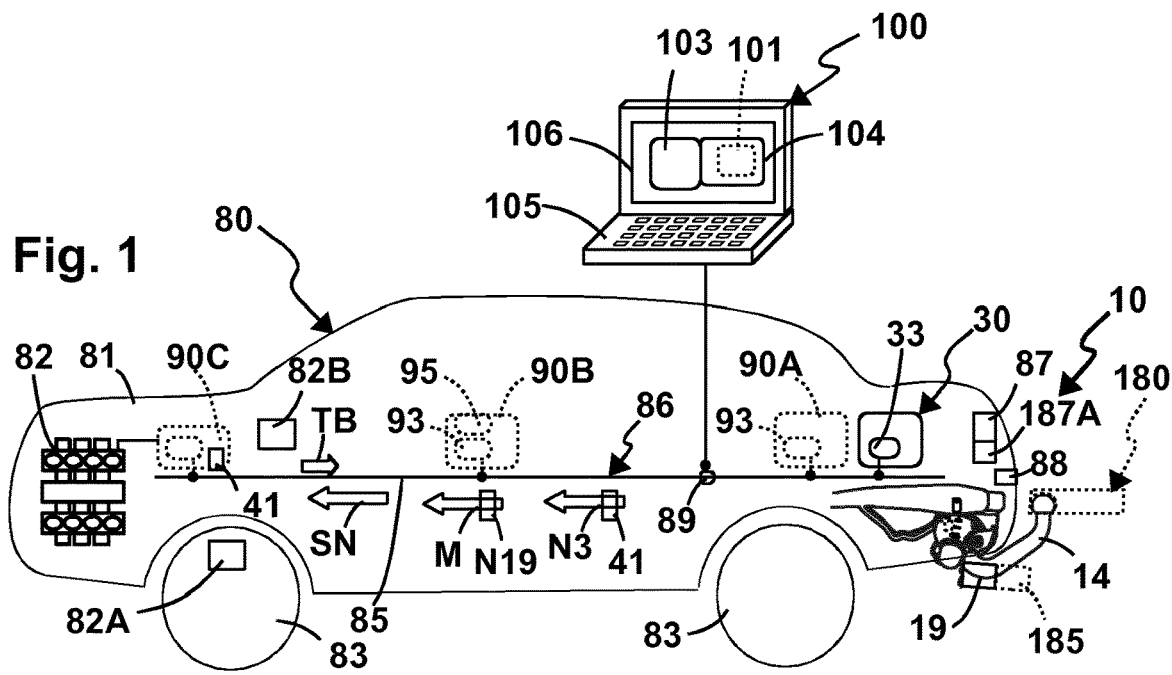

and/or according to bus messages received from the coupling control module on the basis of received configuration identifier.

21 Claims, 3 Drawing Sheets

(51) Int. Cl.
    *B60D 1/62*      (2006.01)
    *B60R 16/023*      (2006.01)
    *B60D 1/26*      (2006.01)
    *B60D 1/64*      (2006.01)
    *B60Q 1/30*      (2006.01)
    *B60Q 11/00*      (2006.01)

(52) U.S. Cl.
    CPC ............ *B60R 16/0232* (2013.01); *B60D 1/26* (2013.01); *B60D 1/64* (2013.01); *B60Q 1/30* (2013.01); *B60Q 11/005* (2013.01); *B60Q 2900/10* (2013.01)

(56) References Cited

U.S. PATENT DOCUMENTS

| | | | | |
|---|---|---|---|---|
| 7,925,409 | B2* | 4/2011 | Fry | B60T 8/17554 |
| | | | | 701/70 |
| 2002/0030590 | A1* | 3/2002 | Dieckmann | B60D 1/62 |
| | | | | 340/475 |
| 2009/0287499 | A1* | 11/2009 | Link, II | G08G 1/20 |
| | | | | 705/317 |
| 2011/0119556 | A1* | 5/2011 | de Buen | H04L 41/12 |
| | | | | 714/E11.053 |
| 2013/0090820 | A1* | 4/2013 | Frashure | B60T 8/885 |
| | | | | 701/29.6 |
| 2016/0214551 | A1* | 7/2016 | Armacost | B60D 1/36 |

FOREIGN PATENT DOCUMENTS

| | | |
|---|---|---|
| EP | 1702802 | 9/2006 |
| EP | 2186684 | 5/2010 |
| EP | 2502762 | 9/2012 |
| EP | 2602133 | 6/2013 |
| EP | 2801487 | 11/2014 |
| EP | 2949490 | 12/2015 |

* cited by examiner

COUPLING CONTROL MODULE FOR A TRAILER COUPLING

CROSS-REFERENCE TO RELATED APPLICATION

This application is a 35 U.S.C. § 371 national stage application of PCT Application No. PCT/EP2018/052626 filed on Feb. 2, 2018, entitled "COUPLING CONTROL MODULE FOR A TRAILER COUPLING," which claims priority to German Patent Application No. 10 2017102927.3 filed on Feb. 14, 2017, and German Patent Application No. 102017129455.4 filed Dec. 11, 2017, each of which are incorporated herein in their entirety by reference.

The invention relates to a coupling control module for a trailer coupling for connection to a vehicle electrical system of a motor vehicle, wherein a trailer can be coupled to the motor vehicle by means of the trailer coupling, wherein the coupling control module actuates and/or monitors at least one electrical function of the trailer coupling, wherein the coupling control module has a bus interface for connection to a digital bus of the vehicle electrical system of the motor vehicle, in particular a CAN bus, wherein the coupling control module can send bus messages via the bus interface to at least one vehicle bus module of the motor vehicle connected to the bus and can receive bus messages from at least one motor vehicle bus module.

The trailer coupling according to the invention comprises, for example, a coupling arm, at whose free end region a coupling piece for coupling a trailer is arranged, for example a coupling ball. In the simplest case, a trailer socket of the trailer coupling, in which a plug of the trailer is inserted, is only connected to the motor vehicle's electrical system that supplies electrical power. Usually, however, coupling control modules are used which control, for example, the trailer socket. The lighting system of the trailer can be controlled, for example, via the power supply of the trailer socket. In modern motor vehicles, the controlling and monitoring components communicate via a digital bus, for example a CAN bus, to which the coupling control module can preferably be connected.

In order for such a coupling control module to be actively logged in the vehicle electrical system, other bus modules of the motor vehicle are usually configured, which are connected to the digital bus. Usually, these further motor vehicle bus modules, which serve for example for controlling the rear lighting of the motor vehicle, with which a driving stability program of the motor vehicle is controlled or similar, are encoded in the workshop. In this case, a programming device is connected to a special diagnostic interface, with which the corresponding configuration identifiers are then encoded in the motor vehicle bus modules. Then, for example, these respond to messages from the coupling control module, namely, for example, whether a trailer is connected to the trailer socket. Accordingly, for example, a driving stability program will then work differently during trailer operation than without a trailer.

It is therefore the problem of the present invention to provide an improved coupling control module and a corresponding method for a coupling control module.

To solve this problem, it is provided in a coupling control module of the aforementioned type that the coupling control module is configured for transmitting at least one configuration bus message to the at least one motor vehicle bus module via the bus interface, wherein the configuration bus message contains a configuration identifier to be entered into configuration data of the motor vehicle bus module, wherein the configuration identifier is provided for enabling the at least one motor vehicle bus module to carry out at least one function depending on the presence of the trailer coupling, in particular the coupling control module, and/or depending on the coupling control module, and/or depending on bus messages received from the coupling control module by means of the received configuration identifier, while the motor vehicle continues to be operated.

Furthermore, a method for integrating a coupling control module of a trailer coupling into a vehicle electrical system of a motor vehicle is provided for solving the problem, wherein a trailer can be coupled to the motor vehicle by means of the trailer coupling, wherein the coupling control module actuates and/or monitors at least one electrical function of the trailer coupling, wherein the coupling control module has a bus interface for connection to a digital bus, in particular a CAN bus, of the vehicle electrical system of the motor vehicle, wherein the coupling control module can send bus messages via the bus interface to at least one vehicle bus module of the motor vehicle connected to the bus and can receive bus messages from at least one motor vehicle bus module. The method provides:

Sending at least one configuration bus message to the at least one motor vehicle bus module via the bus interface through the coupling control module, wherein the configuration bus message contains a configuration identifier to be entered into configuration data of the motor vehicle bus module, wherein the configuration identifier is provided for enabling the at least one motor vehicle bus module to carry out at least one function depending on the presence of the trailer coupling, in particular the coupling control module, and/or depending on bus messages received from the coupling control module by means of the received configuration identifier, while the motor vehicle continues to be operated.

A computer program product according to the invention, for example a communication module or configuration module, has program code and/or commands which can be executed by a processor of the coupling control module or a coupling control module for a trailer coupling for connection to a vehicle electrical system of a motor vehicle and thereby carries out the method steps according to the invention. The coupling control module or the computer, so to speak, performs the method according to the specifications or according to the program code of the computer program product. Thus, the method may, so to speak, be embodied or implemented by a piece of software or a computer program, which is carried out in that a processor of the coupling control module executes the program code or the commands of the computer program.

The basic concept of the present invention is that the coupling control module, so to speak, carries out the configuration of the other bus modules of the motor vehicle so that these can then operate optimally in conjunction with the coupling control module. A functionality of a respective motor vehicle bus module, which has received the configuration identifier through the coupling control module, is changed from the state without the configuration identifier. However, this does not mean that the motor vehicle bus module is, so to speak, always switched to trailer operation, but that it can perform functions adapted to the trailer operation when a trailer is actually attached to the motor vehicle and/or when the trailer coupling is used.

The configuration identifier expediently is or comprises a coding of the at least one motor vehicle bus module for a trailer operation and/or for a trailer coupling being present. For example, in a motor vehicle bus module which is provided for vehicle stabilisation of the vehicle, that is to say, for example an ESP control module, a program for trailer operation is activated. When a trailer is attached to the motor vehicle, for example, a different driving stability control is realised by the motor vehicle bus module than when a trailer is not attached to the motor vehicle. The configuration identifier essentially activates the stability program for trailer operation. A subsequent signal bus message of the coupling control module to the vehicle bus module for vehicle stabilisation, indicating whether a trailer is attached or not, causes the motor vehicle bus module to execute the stability program for trailer operation or to execute a stability program without trailer operation. Without a configuration according to the invention, the motor vehicle bus module for the vehicle stability would not execute the stability program for the trailer operation, even if it received the signal bus message about the attached trailer from the coupling control module. For example, the motor vehicle bus module would ignore or not understand this signal bus message The configuration bus message is advantageously a different bus message from the other bus messages. The other bus messages are, for example, signal bus messages from the coupling control module, control bus messages from the coupling control module or the like. It is also possible that the other bus messages different from the configuration bus message are messages that at least one motor vehicle bus module sends to the coupling control module or receives from the coupling control module, for example for controlling the coupling control module or for receiving information or messages from the coupling control module, or contain at least one such bus message.

The configuration bus message may also be referred to as a parameterisation bus message. The configuration bus message is used to set the motor vehicle bus module to a trailer operation and/or to a communication with the coupling control module. The at least one configuration identifier contains, for example, the information "trailer coupling present on the motor vehicle" or "coupling control module of a trailer coupling connected to the digital bus".

The configuration bus message is a message different from a signal bus message of the coupling control module or is not a signal bus message from the coupling control module. A signal bus message from the coupling control module is sent by the coupling control module to the digital bus. The or a signal bus message in particular provides information from the environment of the trailer coupling, for example its use, an angle signal of a sensor of the trailer coupling or the like, to at least one motor vehicle bus module or the motor vehicle bus module.

The configuration bus message is preferably provided exclusively for the configuration of the at least one motor vehicle bus module. The configuration bus message advantageously contains no message information and or control information of the coupling control module, except for the configuration identifier, wherein the message information comprises or contains, for example, a sensor signal from the environment of the trailer coupling. The control information is used for example for controlling the at least one motor vehicle module depending on a use of the trailer coupling by a trailer and/or a trailer plug.

Apart from the configuration identifier, the configuration bus message advantageously contains no information for outputting to an output means of the motor vehicle and/or for controlling the at least one motor vehicle bus module. The output means is an output means which is fixedly arranged on the motor vehicle and not a diagnostic means which can be detachably connected to the motor vehicle, for example a diagnostic computer or another output device which is connected to an onboard interface or OBD interface. The output means comprises, for example, a loudspeaker or a display which is fixedly arranged on the motor vehicle. The information comprises, for example, information regarding the use of a trailer socket and/or control information, for example to switch off a reversing sensor of the motor vehicle.

The at least one motor vehicle bus module may be, for example, a control module for the control of individual functions, for example the rear lights, monitoring of a rear section or the like. The motor vehicle bus module can also be a gateway, which in turn serves several, for example two or more, motor vehicle bus modules. For example, this gateway can then forward messages from the coupling control module to the motor vehicle bus modules connected to it.

By way of example, the configuration identifier is an identifier which, as it were, determines the presence of the motor vehicle bus module or the trailer coupling or both in the motor vehicle bus modules.

Thus, for example, the motor vehicle bus modules can then address bus messages to the coupling control module, with which this in turn then operates the functions of the trailer couplings. For example, the coupling control module can control a trailer socket depending on such bus messages. Conversely, if for example the trailer socket is occupied, the coupling control module sends bus messages to the digital bus of the motor vehicle that signal the occupancy of the socket. In this way, for example a motor vehicle bus module, which realises a vehicle stabilisation, for example an ESP module, can then respond to the changed load situation and electronically control the motor vehicle accordingly to realise an effective skid protection.

It is preferably provided that the configuration identifier is provided so that the at least one motor vehicle bus module evaluates control bus messages and/or signal bus messages of the coupling control module or, in a function as a gateway, forwards these to at least one motor vehicle bus module or vehicle control module connected to the motor vehicle bus module, for example connected via the bus. A motor vehicle control module is used for example for monitoring and/or controlling functions of the motor vehicle, in particular an illumination device, a distance measuring device or the like. The control bus messages may be, for example, a shutdown control, with which, for example, the coupling control module shuts off the function of a distance measuring device in the rear region of the motor vehicle. The signal bus message, for example, identifies occupancy of the trailer socket or provides usage information about the coupling arm.

Expediently, it is provided that the coupling control module is configured to receive a configuration information bus message from the at least one motor vehicle bus module. The configuration information bus message contains information as to whether the configuration identifier is contained in the configuration data of the at least one motor vehicle bus module. For example, it is possible that the or at least one of the motor vehicle bus modules spontaneously send or sends information which contains its configuration data. From this, the coupling control module can then infer whether the configuration identifier is in principle configured/programmed for operation with a trailer or not, as soon at the motor vehicle bus module sends the information.

Such a message of a motor vehicle bus module may preferably use the coupling control module to send the configuration bus message to the motor vehicle bus module depending on whether the configuration identifier is contained in its configuration data. This ensures that the coupling control module only then sends the configuration identifier to a respective motor vehicle bus module, which actually also needs the configuration identifier. Unnecessary data traffic or programming effort is avoided.

It has already been mentioned that, in principle, a motor vehicle bus module can send information about its respective configuration, as it were, by itself or without request and/or cyclically or the like. Preferably, however, it is provided that the coupling control module actively checks, so to speak, whether the configuration for the trailer operation is performed or not in the motor vehicle bus module or the motor vehicle bus modules.

It is preferably provided that the coupling control module is configured to transmit a query bus message via the digital bus of the motor vehicle, with which the coupling control module in the at least one motor vehicle bus module and/or several motor vehicle bus modules connected to the bus queries the configuration information bus message. Thus, it is therefore possible that the coupling control module queries several motor vehicle bus modules with a broadcast message, as to whether they are configured or not. But it is also possible that, for example, the information as to which motor vehicle bus modules are to be checked is stored in the configuration data of the coupling control module or other program information, for example in the program code of a corresponding configuration module or communication module. Thus, the coupling control module dedicated to at least one motor vehicle bus module or several motor vehicle bus modules can send a query bus message in which then, for example, a bus address of the motor vehicle bus module is specified as the destination address.

It should be mentioned at this point, however, that in principle it is also possible that the coupling control module can actively carry out the configuration without first requesting a configuration identifier from a motor vehicle bus module or even without knowing whether a respective motor vehicle bus module is already configured or contains the configuration identifier. For example, it is possible for the coupling control module to send the configuration bus message to one or more motor vehicle bus modules cyclically or based on other conditions. It can be provided, for example, that the coupling control module makes the configuration of at least one motor vehicle bus module at each start or every start-up of the motor vehicle.

It should also be mentioned for the sake of completeness that the configuration bus message can be specifically addressed to a respective motor vehicle bus module so that only this receives the message or reacts sensitively thereto. However, it is also possible for at least two motor vehicle bus modules or a plurality of motor vehicle bus modules to be addressed by the configuration bus message in a type of broadcast message, so that they can adopt the configuration identifier into their respective configuration data.

However, a process is preferred such that the coupling control module first checks whether a configuration identifier is to be sent and then only sends this when the respective motor vehicle bus module is not equipped with the configuration identifier for trailer operation.

For example, it is advantageous if the coupling control module is configured to send the configuration bus message only after query and/or receipt of the configuration information bus message of the at least one motor vehicle bus module. Only when the motor vehicle bus module has communicated its configuration to the coupling control module, so to speak, is it also actively configured. It does not matter if the configuration information bus message is sent spontaneously from the motor vehicle bus module or if it has to be, so to speak, asked for it by the coupling control module sending the query bus message.

The coupling control module may, so to speak, initiate the configuration of a motor vehicle bus module or a plurality of motor vehicle bus modules under different boundary conditions.

For example, it is provided that the coupling control module is configured to transmit the configuration bus message in dependence on at least one time condition. It is thus possible, for example, for the coupling control module to send at least the query bus message, and if necessary then also the configuration bus message, within predetermined or adjustable time conditions.

Another condition may be a trigger event, for example a respective start-up of the motor vehicle. Thus, for example, it can be provided that the coupling control module respectively sends the configuration bus message at a start of the drive motor of the motor vehicle, wherein both variants are possible, namely the transmission of the configuration bus message without prior query of the configuration information bus message and with such a query.

Another condition may be a first-time power supply of the coupling control module. Thus, when the coupling control module is mounted in the workshop or otherwise with what is known as a de-energised vehicle electrical system, it is, so to speak, in a start-up situation. When power is first applied to the coupling control module or voltage is applied, the coupling control module starts the configuration of the remaining motor vehicle bus modules.

Also, the actuation of a brake of the motor vehicle or a switching of at least one lamp of the motor vehicle or the trailer or both may serve for the coupling control module to transmit the configuration bus message. This can also be spontaneous, i.e. the coupling control module does not query the configuration information bus message with which the motor vehicle bus modules communicate their respective configuration data.

It is also possible that the coupling control module evaluates an electrical trigger signal and/or a trigger bus message before sending the configuration bus message.

It is also possible that the coupling control module evaluates, for example, a specific operating sequence as a trigger event or as another event that triggers the transmission of the configuration bus message. For example, it is possible for the operator to deliberately switch the light of the motor vehicle or a predetermined lamp of the motor vehicle on or off. Thus, e.g. the actuation of a brake, which ultimately also leads to the actuation of a brake light of the motor vehicle, may be evaluated by the coupling control module such that a coding of one or more motor vehicle bus modules is necessary.

Furthermore, the trigger signal may also be that the coupling control module detects a trailer. This can e.g. be recognised in that the trailer socket is occupied and this is detected by the coupling control module. Also, a load on a ball bar or a coupling arm of the trailer coupling can be evaluated by the coupling control module to determine the trigger event and thus to send the configuration bus message.

Combinations of these are readily possible.

For example, it is possible for the brake to be actuated at the same time and for a predetermined light sequence on the motor vehicle, which the coupling control module recognises, to be switched. If, for example when the brake is actuated, the rear fog lamp is turned on and off several times, this can be evaluated by the coupling control module as a trigger signal for coding or for sending the configuration bus message.

A preferred embodiment of the invention provides that the coupling control module has at least one manually operable electrical operating switch for generating the trigger signal or trigger event. For example, a push-button or the like may be provided, which is operated by the operator to trigger or control the coupling control module to transmit the configuration bus message.

It is possible that the coupling control module is or can be directly connected to the motor vehicle bus or the digital bus. For this purpose, for example, a bus connection can be looped or interrupted or contacted. Alternatively or additionally, however, it is also possible for the coupling control module to be configured for connection to an onboard diagnostic interface of the motor vehicle. For example, a connector or other connection possibility or interface for connection to an onboard diagnostic interface can be provided, with which the coupling control module can be coupled to the digital bus of the motor vehicle. Thus, it is not necessary to provide a special infrastructure for connecting the coupling control module. The existing onboard diagnostic interface can be used. It is for example possible that the coupling control module has a connector, to which in turn a diagnostic device can be connected, for example in a motor vehicle workshop. The connector of the coupling control module is thus switched sandwiched between the diagnostic interface of the motor vehicle and this connector of the diagnostic device from the workshop. Thus, the connector preferably has sockets for inserting another connector in the onboard diagnostic interface.

It is preferred if the coupling control module has a parameterisation interface for parameterising the configuration identifier and/or the at least one motor vehicle module has identifying data and/or data relevant to at least one motor vehicle module and standing in connection to the sending of the configuration identifier. Thus, for example, the type and configuration of the respective configuration identifier can be set via the parameterisation interface. Furthermore, for example, bus addresses can be set to be parameterised motor vehicle bus modules. However, it is also possible that these parameters are permanently parameterised in the coupling control module or stored in the software of the coupling control module. For example, the coupling control module is already factory set so that it can interact with a particular type of motor vehicle or a particular motor vehicle series. Separate coding or parameterisation is not necessary.

The parameterisation interface can be, for example, a USB interface or the like. The parameterisation interface can thus comprise a wired interface and/or a wireless interface. For example, parameterisation via USB (Universal Serial Bus), by radio, for example WLAN wireless (Local Area Network) or the like, is readily possible.

It is advantageous if the coupling control module is configured to transmit switching information to the at least one motor vehicle bus module, wherein the motor vehicle bus module can be switched based on the switching information into a parameterisation mode in which the motor vehicle bus module is enabled for parameterising the configuration identifier. Thus, if the motor vehicle bus module per se is not open for parameterisation, but is set for a normal driving operation, the coupling control module may send a corresponding start-up message or switching information to the motor vehicle bus module via the digital bus. This can readily function with multiple motor vehicle bus modules. It is thus possible, for example, for a plurality of motor vehicle bus modules to be switched in one broadcast message to the parameterisation mode or configuration mode in which the respective motor vehicle bus module is ready or enabled or, so to speak, open for the configuration bus message or for receiving the configuration identifier.

Furthermore, it is advantageous if the coupling control module is configured for transmitting at least one acceptance information for authentication and/or identification in the at least one motor vehicle bus module, wherein the motor vehicle bus module takes over the configuration identifier as a function of the acceptance information into its configuration data. For example, authentication data or identification data, e.g. password and sender identification, can be sent from the coupling control module to a motor vehicle bus module respectively to be configured. This ensures that only authorised or correctly set coupling control modules of one or more motor vehicle bus modules can be configured. It is preferred if the coupling control module has coupling means for coupling a trailer socket to the vehicle electrical system of the motor vehicle, which coupling means is provided for plugging a connector of the trailer. For example, the coupling control module has corresponding power electronic or other outputs to which the trailer socket can be coupled.

Furthermore, it is advantageous if the coupling control module has control means for controlling at least one electric drive.

The drive can be provided for example for a fixing device for fixing the trailer coupling in at least one operating position, in particular a use position.

The drive may also be provided for adjusting a coupling arm of the trailer coupling between a use position provided for coupling the trailer and a non-use position provided for the coupling arm when not in use. For example, the coupling arm is concealed behind a bumper of the motor vehicle when in the non-use position. The coupling arm is expediently pivotably and/or displaceably held between the use position and the non-use position on a holder, which in turn is attached to the support structure of the motor vehicle. For example, a carrier or transverse member is provided at the rear of the motor vehicle, on which the holder for the trailer coupling or the coupling arm is arranged.

It is readily possible that several drives are controlled by the coupling control module, for example a drive for a fixing device and a drive for an adjustment of the coupling arm between the use position and the non-use position.

It is preferred if the coupling control module is configured to output a message, for example an optical and/or acoustic message, until it has sent the configuration identifier to the at least one motor vehicle bus module after a first start-up. Thus, for example, an LED or other lamp can be provided which signals that the coupling control module has not yet started the configuration or has not yet completed it. Thus, a high level of security is ensured that the motor vehicle is put into operation only when the motor vehicle bus has been as it were completely configured or when the motor vehicle bus modules have been completely configured.

It is also expedient if the coupling control module for determining that at least one motor vehicle bus module of the motor vehicle has not received the configuration identifier is configured based on a monitoring of a bus communication to the bus of the motor vehicle. Thus, for example, if a parking sensor is turned on and the associated rear motor vehicle bus module, so to speak, monitors the parking space behind the motor vehicle, even though a trailer is coupled, the coupling control module evaluates the corresponding messages and starts the configuration mode, for example sends the configuration bus message to the rear vehicle bus module. The coupling control module thus recognises that the motor vehicle does not know, as it were, that a trailer coupling is be connected and, in particular, the coupling control module should operate in conjunction with the other motor vehicle bus modules on the digital bus of the motor vehicle.

Figure 2:
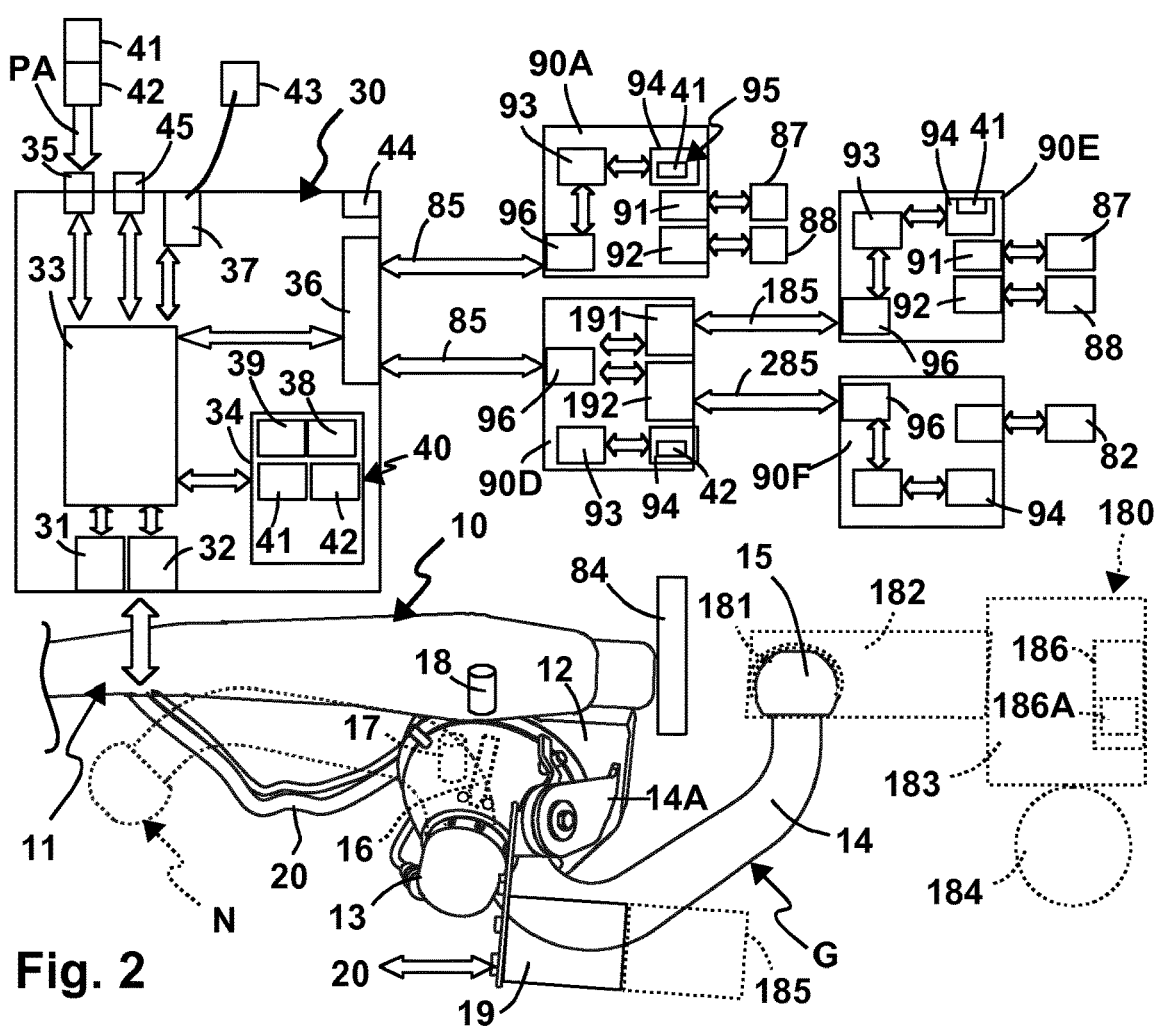
Figures 3, 4:
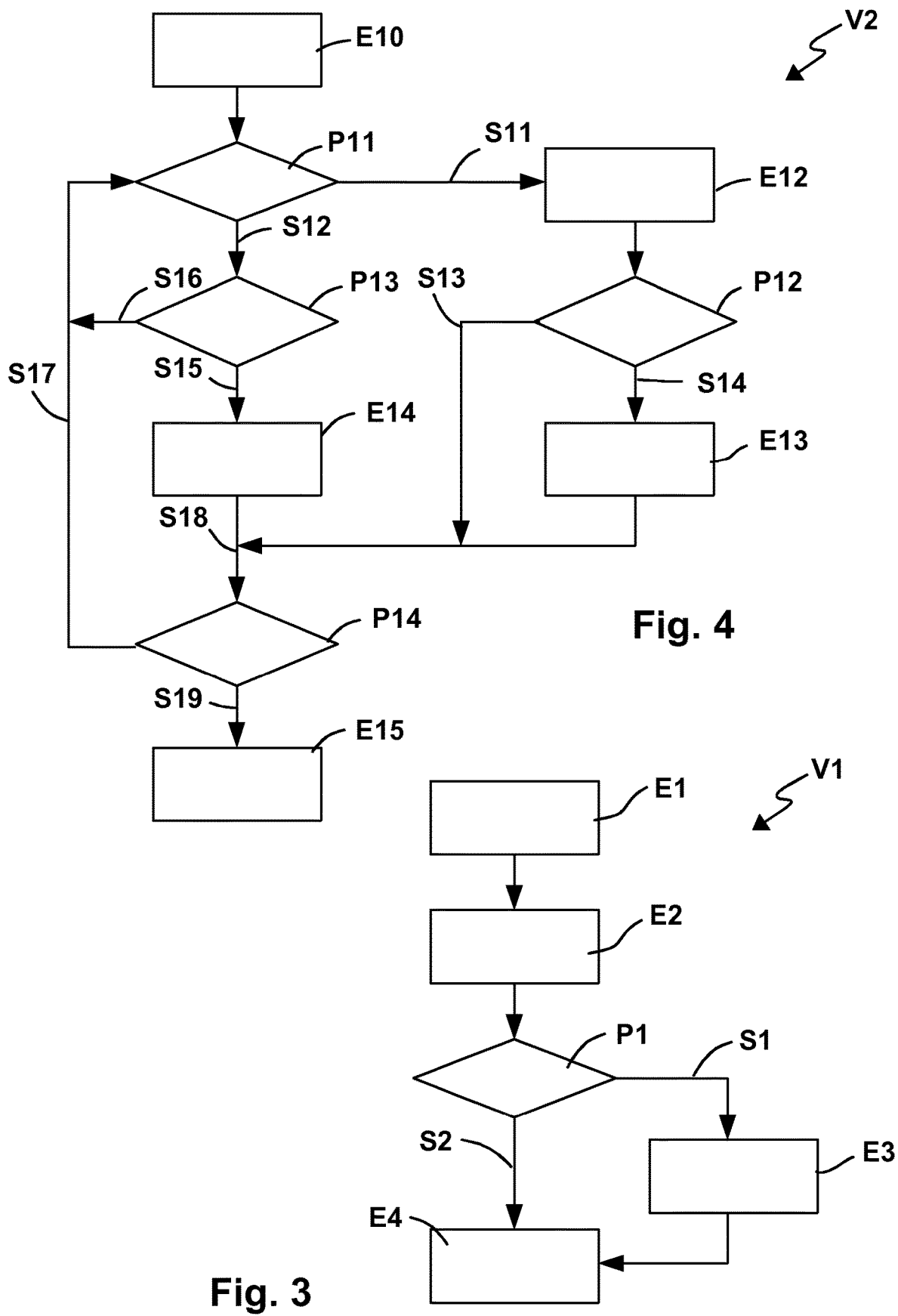
Figure 5:
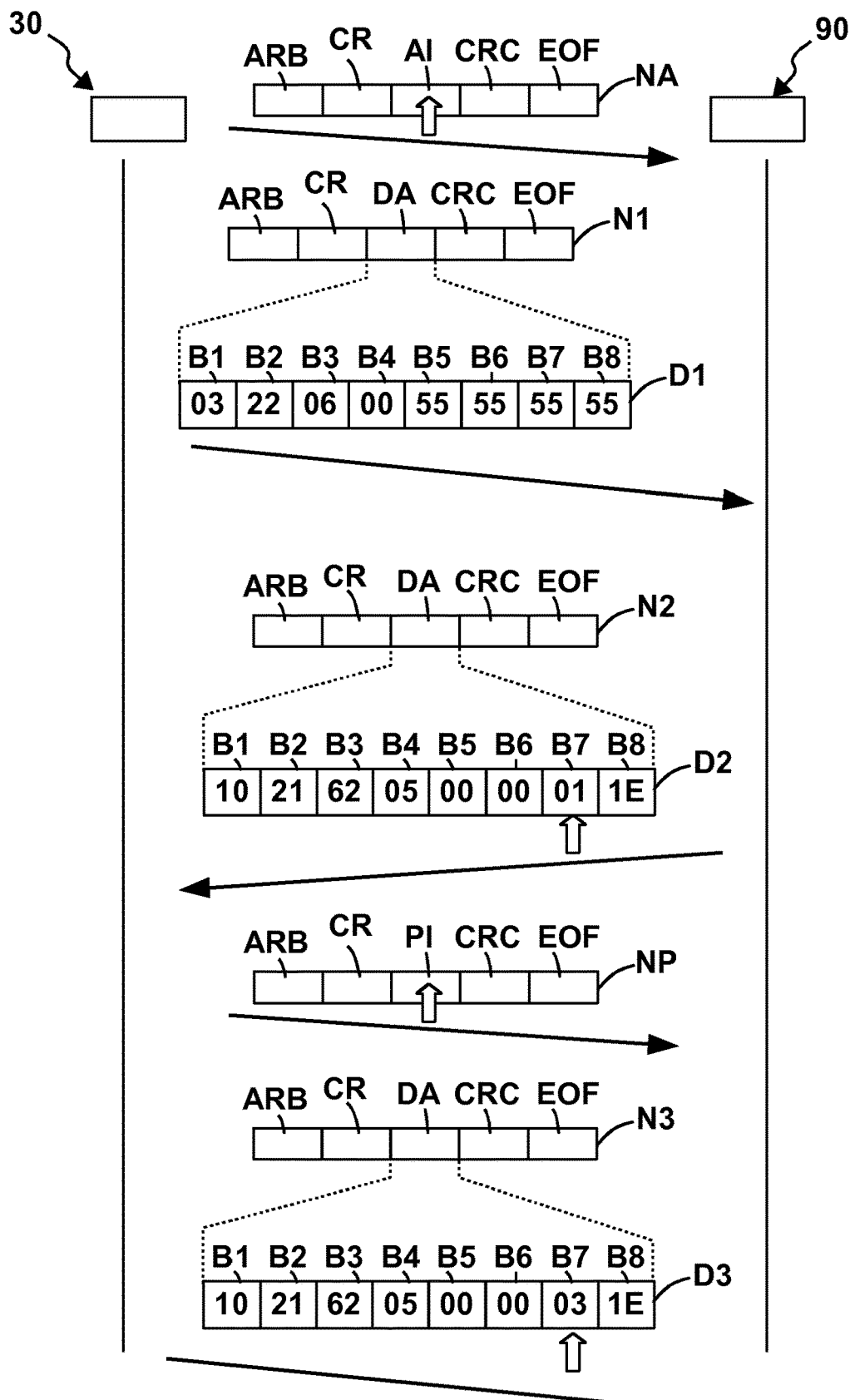

Hereinafter, embodiments of the invention will be explained with reference to the drawings. In the figures:

FIG. 1 a schematic side view of a motor vehicle with a trailer coupling according to the invention, FIG. 2 the trailer coupling of the motor vehicle according to FIG. 1 with a coupling control module and connected motor vehicle bus modules in a schematic representation, FIG. 3 a schematic flow diagram for a vehicle coding, FIG. 4 a somewhat detailed diagram relating to a vehicle coding;

FIG. 5 a communication between the coupling control module according to FIGS. 1, 2 and a motor vehicle bus module in connection with a coding.

A motor vehicle 80 having a body 81 is driven by an engine 82, such as an electric motor, an internal combustion engine, or a combination thereof. The engine 82 drives gears 83 in a conventional manner. A trailer 180 can be attached to the motor vehicle 80 by means of a trailer coupling 10. The trailer coupling 10 comprises, for example, a support assembly 11 which is attached to the body 81 of the motor vehicle 80, for example screwed, welded or the like. On the support assembly 11, in particular a transverse member thereof, a holder 12 of the trailer coupling 10 is fixed, which is configured for example for a fixed holding of a coupling arm 14 or may comprise a plug receptacle (not shown) for insertion of a coupling arm 14. In the present case, however, a bearing 13, in particular a pivot bearing, sliding bearing or pivot sliding bearing is provided on the holder 12, with which the coupling arm 14 can be adjusted between a use position G shown in solid lines in FIG. 2 and a non-use position N shown in dashed lines.

The coupling arm 14 carries at its free end a coupling ball 15, which represents by way of example other types of coupling elements, such as polygonal coupling elements or the like. The coupling ball 15 and the section of the coupling arm 14 carrying the coupling ball 15 is advanced in front of a bumper 84 in the use position G so that the trailer 180 can be coupled. For example, a towing ball coupling 181 of the trailer 180, which is arranged on a drawbar 182, can be coupled to the coupling element or the coupling ball 15. The trailer 180 has a main body 183, for example a loading trough, a caravan structure or the like, which can be wheeled on wheels 184 on a ground surface. The trailer 180 further comprises a connector 185, via which an illumination device 186 of the trailer 180 can be supplied with power. In particular, lamps (not shown), such as tail-lights, brake lights, indicators or the like, of the illumination device 186 can be powered and controlled via a corresponding control or current supply of the connector 185, which preferably has individual contacts.

The coupling arm 14 can be, for example, interlockingly fixed and/or clamped by means of a fixing device 16 at least in the use position G. To release the fixing device 16, a drive 17 is expediently provided, which can also be designed to close or lock the fixing device 16. Expediently, the fixing device 16 is spring-loaded into the position locking the coupling arm 14 in the use position G, so that the drive 17 is a release drive.

Furthermore, the coupling arm 14 can be driven by means of a drive 18 between the use position G and the non-use position N.

A trailer socket 19 serves for inserting the connector 185 of the trailer 180. This can be arranged for example on the coupling arm 14 or a separate holder 14*a*.

The motor vehicle 80 has a vehicle electrical system 86 with a digital bus 85, for example a CAN bus. Motor vehicle bus modules 90A, 90B, 90C, 90D, 90E, 90F, which are also sometimes referred to below as "motor vehicle bus modules 90", are connected to the bus 85. For example, the motor vehicle bus module 90C is an engine control device for driving the engine 82. The motor vehicle bus module 90B, in turn, is a control device for a driving stability program of the motor vehicle 80. The motor vehicle bus module 90A controls, for example, an illumination device 87 of the motor vehicle 80 and a distance measuring device 88 for a rear region or a movement space behind the motor vehicle 80 (behind in the direction of travel). For example, the illumination device 87 comprises brake lights, rear lighting devices, reversing lights, indicators or the like. The distance measuring device 88 has contactless distance sensors, in particular ultrasonic sensors, for example.

The trailer socket 19 and the drives 17, 18 are connected to a coupling control module 30 via the line assembly 20. In FIG. 2, this is indicated with respect to the trailer socket 19 only by a double arrow. The coupling control module 30 controls the functions of the trailer coupling 10 via the line assembly 20, for example, the respective terminals of the trailer socket 19 and/or the drive 17 and/or the drive 18. Thus, the drive 17 for releasing the fixing device 16 and the drive 18 for pivoting or adjusting the coupling arm 14 between the use position G and the non-use position N can be controlled, for example, using the coupling control module 30. Corresponding power electronics, in particular for the drives 17 and 18, are indicated in FIG. 2 as an interface 31, that is to say a control means.

An interface 32 is provided for the trailer socket 19. The interface 32 forms a coupling means for coupling the trailer socket 19.

The coupling control module 30 includes a processor 33 that communicates with a memory 34. In the memory 34, for example, a control program 38 for controlling the functions of the trailer coupling 10 and a communication program 39 are stored, whose program code can be executed by the processor 33, for example, to perform the functions shown in flowcharts according to FIGS. 3 and 4.

The coupling control module 30 may digitally send or receive data to the bus 85 via a bus interface 36. This will be explained in more detail.

The coupling control module 30 communicates via the bus 85 with the motor vehicle bus modules 90A-90F, for example, to report the current operating status of the trailer coupling 10 on the bus 85. Thus, for example, if the trailer socket 19 is occupied, the connector 185 is plugged in, the coupling control module 30 on the bus 85 signals this to the motor vehicle bus modules 90A-90F. For example, in this case, power flows through the trailer socket 19, the connector 185 and the illumination device 186, or the resistance of this configuration is less than when no connector 185 is plugged into the trailer socket 19. Thus, the occupancy status of the trailer socket 19 can be determined by the coupling control module 30, for example by a corresponding configuration of the interface 32 or design of the interface 32 and reported to the bus 85. In this case, for example, the motor vehicle bus module 90B responsible for the vehicle stabilisation of the motor vehicle 80 will select a different operating mode than when no trailer 180 is coupled to the motor vehicle 80. The physical conditions during the trailer operation are different than during an operation without trailer. This is known per se. Also, for example, the engine controller or motor vehicle bus module 90C reacts differently to trailer operation, for example, by operating other load programs or drive programs to drive the engine 82. As a result, for example, an overload of the engine 82 can be avoided during trailer operation.

For example, the control program 38 controls the functions of the trailer socket 19 such that the illumination device 186 of the trailer 180 operates synchronously with the illumination device 87 of the motor vehicle 80, meaning that, for example, indicators 87A of the motor vehicle 80 and indicators 186A of the trailer 180 are activated on the same side, the brake lights are activated and the like.

The control program 38 can also be provided, for example, to control one or both of the drives 17, 18. Thus, for example, when the motor vehicle 80 is traveling, if for example a minimum speed has been exceeded, the function of the drive 17 and the function of the drive 18 can be deactivated. Thus, for example, the coupling arm 14 cannot be adjusted between the use position G and the non-use position N during driving operation of the motor vehicle 80. Thus, the coupling control module 30 also reacts with its control program 38 to the respective operating state of the motor vehicle 80.

It will be appreciated that communication between the coupling control module 30 and the motor vehicle bus modules 90A-90F is essential for optimum operation of the motor vehicle 80 alone or with the trailer 180.

Now, typically, the motor vehicle bus modules 90A-90F of the motor vehicle 80 are not configured for operation with a trailer coupling, if the motor vehicle 80 does not yet having a trailer coupling 10 on manufacture or delivery. For example, the driving stability program of the motor vehicle bus module 90B may normally only realise the operation of the motor vehicle 80 without the trailer 180. However, a further program or a configuration for trailer operation is usually already present in the delivery state or production state of the motor vehicle bus module 90B, so that this can in principle perform a trailer operation. The relevant program is however not accessible.

A motor vehicle bus module 90A, which is responsible, for example, for the rear functions of the motor vehicle 80, initially only "knows" the operation of the motor vehicle 80 alone, that is to say without a trailer 180. For example, the parking space control or distance measuring device 88 is always active when the motor vehicle 80 is operated, for example, in a low speed operation and/or when a reverse gear is engaged or the motor vehicle 80 is ready for reversing. The illumination device 87 is also controlled by the motor vehicle bus module 90A typically as if no trailer 180 is attached. Thus, for example, a rear fog lamp is always turned on or off with appropriate activation in the cockpit of the motor vehicle 80, regardless of whether a trailer 180 is attached or not. The motor vehicle bus module 90A thus always operates in the delivery state in pure "motor vehicle operation without a trailer".

The illumination device 87 and the distance measuring device 88 are connected via interfaces 91, 92 to the motor vehicle bus module 90A.

The functions of the motor vehicle bus modules 90A-90F, however, are adapted to operate with the trailer coupling 10 only when respectively provided with a configuration identifier 41. The configuration identifier 41 can also be referred to as parameterisation "trailer operation". For example, a bit in the memory 94 of a respective motor vehicle bus module 90 in the delivery state of the motor vehicle 80 is set to logic "0". However, if the configuration identifier 41 is entered, the bit is set to logic "1".

A processor 93 of a respective vehicle bus module 90A-90F executes one or more control programs, in order to implement the respective functionality of the motor vehicle bus module 90A-90F, such as vehicle stabilisation, engine control of the engine 82, or the like. The processor 93 or the control program executed by it, for example, reads out the contents of the memory 94 with regard to the configuration identifier 41.

In FIG. 2, an alternative configuration is shown as an example. In the upper part of the illustration, the communication of the coupling control module 30 directly to the motor vehicle bus module 90A, the rear control unit, is shown. In the lower part, a communication via a gateway is shown in detail, which is not shown in the overview representation of FIG. 1. The gateway is represented by the vehicle bus module 90D, which in turn communicates with the motor vehicle bus modules 90E and 90F via connections 185 and 285. Thus, for example, it is conceivable that the gateway 90D is switched to the trailer operation by the configuration identifier 42 which it has received from the coupling control module 30 and can communicate with the motor vehicle bus modules 90E and 90F connected to it in accordance with trailer operation when the trailer coupling 10 is used. For example, bus messages from the coupling control module 30 may be forwarded from the gateway 90D to the motor vehicle bus modules 90E and 90F, wherein these messages may also be translated into other messages or augmented with information signalling trailer operation to the motor vehicle bus modules 90E and 90F. In the reverse direction, the communication from the motor vehicle bus modules 90E and 90F via the gateway or the motor vehicle bus module 90D to the coupling control module 30 can also be realised. The motor vehicle bus modules 90E and 90F may, for example, constitute vehicle control modules which control and/or monitor functions of the motor vehicle, for example the illumination device 87. Thus, for example, when messages of the motor vehicle bus modules 90E or 90F are relevant to the coupling control module 30, they are forwarded from the gateway or motor vehicle bus module 90D to the coupling control module 30. The connections 185, 285 may of course also be bus connections or are parts of the bus 85.

Furthermore, it is possible for the motor vehicle bus module 90D, in its function as a gateway, to serve, as it were, as an intermediate element of the parameterisation or configuration of the motor vehicle bus modules 90E or 90F explained below. For example, a configuration of the motor vehicle bus module 90E may operate via the gateway or motor vehicle bus module 90D such that at the end of this configuration process, as will be explained, the configuration identifier 41 is in the memory 94 of the motor vehicle bus module 90E and may then implement the trailer operation.

For example, instead of the motor vehicle bus module 90A already explained, the motor vehicle bus module 90E can serve as a rear control device and control or operate the illumination device 87 and/or the distance measuring device 88 via its interfaces 91, 92.

The communication program 39, which can also be called or regarded as a configuration program, carries out, for example, the configuration program schematically indicated in FIG. 3 or a check as to whether a configuration of one or more of the motor vehicle bus modules 90A-90F is necessary or not.

In a step E1, for example, the communication program 39 receives a trigger or a trigger signal. A trigger may be, for example, that an operating switch 45 of the coupling control module 30 is actuated, for example a pressure switch or the like. However, a trigger signal or trigger event may also be in combination with or separate therefrom, e.g. a state of ignition of the engine 82 changes or a brake 82A of the motor vehicle 80 is actuated in a specific operating sequence or for the first time. Thus, for example, when the engine 82 is started or turned off, a steering wheel switch or key switch 82B of the motor vehicle 80 is switched from a switched-off position to a switched-on or drive-ready position, that is, when a "change of ignition" generally occurs, this is detected by the communication program 39 in step E1 as a trigger signal. For example, a motor vehicle bus module, for example, the motor vehicle bus module 90C, to which the key switch 82B is coupled, sends a message on the operation of the key switch to the bus 85, which represents a trigger bus message TB for the communication program 39 or the coupling control module 30.

Further trigger signals are, for example, that a driver of the motor vehicle 80 switches on or off a specific light of the illumination device 87 or carries out a specific operating sequence. For example, even if the coupling control module 30 recognises the presence of a trailer due to a load on the coupling arm 14 due to the occupancy of the trailer socket 19 by the connector 185 or the like, this may serve as a trigger signal or trigger event. It is possible for the trigger event to be a trigger event that has been dedicated, for example, when installing the trailer coupling 10 or the coupling control module 30. However, it is also possible that a configuration of the motor vehicle 80 to the trailer operation or the presence of the trailer coupling must be repeated multiple times, for example, when the motor vehicle 80 was in the workshop.

For example, it is possible that in a typical workshop stay a diagnostic device 100 is connected and a diagnostic program 101 is executed. With the diagnostic program 101, whose program code can be executed by a processor 103 of the diagnostic device 100 and which is stored, for example, in a memory 104, it is possible, for example, to check the functions of the motor vehicle bus modules 90A-90F in a known manner in a workshop and, if necessary, to reconfigure these. For example, a new driving stability program is loaded into the motor vehicle bus module 90B as innovations arise. As a rule, configuration data of the motor vehicle 80 are also stored in the diagnostic device 100 or in a central database to which the diagnostic device 100 can be connected. The central database is for example a database operated by the manufacturer of the motor vehicle 80. However, if the manufacturer of the motor vehicle 80 is not aware, as it were, that the motor vehicle 80 has been equipped or retrofitted with a trailer coupling 10, the configuration identifiers 41, 42 may be overwritten or deleted in the case of a respective diagnosis using the diagnostic device 100. In such a situation, the invention provides a workaround, for example. But even if the motor vehicle 80 is retrofitted with the trailer coupling 10 and in particular the coupling control module 30 is connected to the bus 85, the coupling control module 30 can perform the corresponding configuration of the rest of the motor vehicle bus modules 90A-90F.

The diagnostic device 100 can be connected, for example, via an onboard diagnostic interface 89.

The onboard diagnostic interface 89 may also be utilised by the coupling control module 30, for example, to configure one or more of the motor vehicle bus modules 90A-90F. For example, the coupling control module 30 has an interface 37 for use with the onboard diagnostic interface 89. But it is also possible that the coupling control module 30, as already explained, is designed or equipped for direct connection to the bus 85 via a bus interface 36.

In a step E2, in the method V1, for example, it is checked whether the motor vehicle 80 as a whole, but in particular one or more of the motor vehicle bus modules 90A-90F, is coded for trailer operation or operation with the coupling control module 30. If it is determined in a checking step P1 that a configuration is already provided for the trailer operation with the coupling control module 30, the method V1 branches to a step E4, i.e. an end. However, if the coding is not present or is incomplete, the method V1 proceeds in a branching step S1 to a step E3, which provides the coding of one or more of the motor vehicle bus modules 90A-90F.

Step E3 is represented in more detail as method V2, namely as a coding process.

For example, the method V2 starts in a start step E10, from which it is first checked whether a respective motor vehicle bus module 90A-90F has to be set to a diagnostic mode. In the diagnostic mode, the respective motor vehicle bus module 90A-90F is ready, for example, to send information about the parameterisation with the configuration identifier 41 or 42 or to receive the configuration identifier 41, 42 and, if necessary, store it in its memory 94.

If it is determined in the checking step P11 that a motor vehicle bus module 90A-90F to be configured or coded cannot be put in the diagnostic mode, the method V2 branches to a checking step P13, in which it is checked how often the step P11 is performed. If a certain number of repetitions have not yet been reached, the checking step P13 branches to a branch S16 and back to the checking step P11.

However, if it is determined in checking step P13 that a certain number of attempts to place a respective motor vehicle bus module 90A in a diagnostic mode were unsuccessful, the method V2 concludes in step E14 that the respective control device or motor vehicle bus module 90A-90F is absent. Such a situation can have happened, for example, when different motor vehicle bus modules 90 are provided in the motor vehicle 80 for the function of the distance measuring device 88 and the function of the illumination device 87. In any case, a motor vehicle bus module is always provided for an illumination function, while the distance measuring device does not have to be installed in every motor vehicle 80. This is often an optional variant or a desired configuration. If, for example, there is no distance sensor or distance measuring device 88, the associated motor vehicle bus module 90 is not necessary either, which the coupling control module 30 finally detects in the checking step P11 or P13, and branches to the step E14. Step E14 proceeds in a branch S18 to a further checking step P14 in which it is checked whether all motor vehicle bus modules 90A-90F which are to be theoretically provided with the configuration identifier 41 or 42 have been queried or configured. If this is not the case, the method V2 branches into a branch S17 back to the checking step P11, or otherwise in a branch S19 to the final step E15.

The actual diagnosis or configuration is shown in the right part of the method V2.

If a respective motor vehicle bus module 90A-90F is put into a diagnostic mode, the method V2 branches in the checking step P11 into a branch S11, which leads to a step E12. This means that the configuration data of a respective motor vehicle bus module 90A-90F are queried or read out. After receiving the respective answer from the motor vehicle bus module 90A-90F, the coupling control module 30 can check in the checking step P12 whether the motor vehicle bus module 90A-90F is coded, that is whether it has the configuration identifier 41 or 42 or not. If this is already the case, i.e. if the coding for the trailer operation or the trailer coupling 10 is present, the method V2 branches in a step S13 to the checking step P14, i.e. to the step in which it is checked whether all necessary codes or configurations are made in the motor vehicle bus modules 90A-90F of the motor vehicle 80.

Otherwise, the method V2 proceeds from checking step P12 via the path S14 to the actual configuration step or coding step, namely step E13, in which the configuration for the trailer operation or trailer coupling 10 is made at a respective motor vehicle bus module 90A-90F. For example, the coupling control module 30 sends the configuration identifier 41, 42 to the motor vehicle bus module 90A, the gateway motor vehicle bus module 90D, or the like, which then takes the configuration identifier 41, 42 into its respective memory 94.

Exemplary communication between the coupling control module 30 in one of the motor vehicle bus modules 90A-90F is shown in FIG. 5. One of the respective motor vehicle bus modules 90A-90F is referred to as motor vehicle bus module 90.

The modules 30, 90 communicate with each other via the bus 85 or the interface 37. The modules 30, 90 send, for example, CAN messages, for example a message N1, N2 or the like, i.e. CAN bus messages, which have the typical structure with arbitration field ARB, control field CR, data field DA, CRC field CRC and an end of frame field. The messages are also referred to as frames. In the following, the content of the data DA, for example the data D1, is essentially interesting.

The data field with the data D1 contains, for example, data B1-B8. The coupling control module 30 thus sends, for example, first a query bus message NA, with which it queries the respective configuration of the motor vehicle bus module 90A-90F. The query bus message NA can be directed to a plurality of motor vehicle bus modules 90, i.e. a broadcast message, or dedicated and targeted to one of the motor vehicle bus modules 90A, 90B, 90C, 90D, 90E, 90F, so that only its specific configuration data is queried.

For example, it could be provided that the identifiers B5-B8 are respectively at the value 55, which may represent the query in several of the motor vehicle bus modules 90. It is also possible for a broadcast identifier or an addressing to a plurality of motor vehicle bus modules to be specified in an address field of a bus message.

A respective motor vehicle bus module 90 responds to the query bus message N1 with the configuration information bus message N2, which contains the corresponding configuration or parameterisation of the respective motor vehicle bus module 90. For example, the data field B7 is provided with the identifier or information 01, which signals that the respective motor vehicle bus module 90 is not provided with the configuration identifier 41.

The coupling control module 30 then sends the configuration bus message N3 to the motor vehicle bus module 90, which contains the configuration identifier 41 in the data field B7, i.e. the value of the data field B7 has been changed from 01 (bus message N2) to the value 03.

However, as explained, a scenario is also conceivable in which the coupling control module 30 cyclically sends the message N3 with the data D3 to each or all of the motor vehicle bus modules 90, i.e. that they are virtually compulsorily prompted repeatedly to accept the configuration identifier 41 in their respective configuration data 95.

The coupling control module 30 may be, so to speak, factory-set, i.e. in the delivery state, to be configured for the configuration of the motor vehicle bus modules 90. For example, the configuration identifiers 41, 42 could be included in the configuration data 40 of the coupling control module 30. Furthermore, the addresses and/or numbers of the motor vehicle bus modules 90 to be configured can also be provided in the configuration data 40. Furthermore, it is possible for special operating modes, configuration modes or the like which are required for a respective type of motor vehicle 80, in particular its motor vehicle bus modules 90, to be stored in the configuration data 40.

But it is also possible that the coupling control module 30 can be parameterised via a parameterisation interface 35 via which, for example, the configuration data 40 can be configured or parameterised. The parameterisation interface 35 is, for example, a USB interface, a WLAN interface or the like. For example, the coupling control module 30 may receive via the parameterisation interface 35 a message PA in which e.g. the configuration identifiers 41 and/or 42 are included. For example, the diagnostic device 100 or a similar device may be connected to the parameterisation interface 35 to perform the parameterisation.

Safety functions can readily be implemented by the coupling control module 30. Thus, for example, an authentication and/or identification may be provided in a respective motor vehicle bus module 90 prior to transmission of the query bus message N1. Thus, for example, the coupling control module 30 initially, i.e. before the query bus message N1, transmits an acceptance message NA with acceptance information AI, for example including authentication data and/or identification data for the coupling control module 30. This ensures that no unauthorised or inappropriate coupling control module, as it were, gains access to the configuration data of the respective motor vehicle bus module 90.

It may also be necessary that the coupling control module 30 must switch a respective motor vehicle module 90 into a parameterisation mode or standby mode so that it is responsive or enabled for receiving the configuration bus message N3. For example, it may be provided that the coupling control module 30 first sends the switching bus message NP containing the switching information PI before the transmission of the configuration bus message N3. The switching information PI enables the receiving motor vehicle bus module 90 to receive the configuration bus message N3.

If the configuration identifiers 41 and/or 42 are present in the motor vehicle bus modules 90, for example, they evaluate a signal bus message M which contains usage information N19. The usage information N19 signals whether the trailer socket 19 is used by the trailer 180 or the connector 185 or not.

To connect the coupling control module 30 to the onboard diagnostic interface 89, a connector 43 may be provided.

After the configuration of the automobile bus modules 90 to the configuration identifier 41 and/or 42, a respective motor vehicle bus module 90 may also be receptive to, for example, a control bus message SN. With the control bus message SN or other such control bus messages, the coupling control module 30 may send, for example, control information to one or more of the motor vehicle bus modules 90. For example, based on the control bus message SN, a control program of the motor vehicle bus module 90C responsible for the engine 82 can be activated, which is provided for trailer operation.

It is possible for the coupling control module 30, for example via output means 44, in particular optical output means (an LED or the like) and/or acoustic output means, such as speakers or buzzers, to indicate to an operator that a first configuration, i.e. sending the configuration identifier in 41, 42 to the motor vehicle bus modules 90, has not yet taken place. This may, for example, cause the operator to operate the operating switch 45. This warning can take place, for example, during a first start-up of the coupling control module 30. It is also possible that the coupling control module 30 detects a connection of the diagnostic device 100.

As mentioned, with respect to the connection of the diagnostic device 100, the configuration identifier in 41 and/or 42 in the motor vehicle bus modules 90 can be lost or overwritten, so to speak. The coupling control module 30 can also in this case, as it were, automatically start again with the configuration of the motor vehicle bus modules 90 and/or generate the warning via the output means 44.

The invention claimed is:

1. A coupling control module for a trailer coupling for connection to a vehicle electrical system of a motor vehicle, wherein a trailer is capable of being coupled to the motor vehicle by the trailer coupling, wherein the coupling control module actuates and/or monitors at least one electrical function of the trailer coupling, wherein the coupling control module comprises a bus interface for connection to a digital bus of the vehicle electrical system of the motor vehicle, wherein the coupling control module is capable of sending bus messages via the bus interface to at least one motor vehicle bus module of the motor vehicle connected to the digital bus and is capable of receiving bus messages from at least one motor vehicle bus module, wherein the coupling control module is configured for sending at least one configuration bus message to the at least one motor vehicle bus module via the bus interface, wherein the configuration bus message contains a configuration identifier to be entered into configuration data of the motor vehicle bus module, wherein the configuration identifier is provided for enabling the at least one motor vehicle bus module to carry out at least one function depending on the presence of the trailer coupling and/or depending on bus messages received from the coupling control module by the received configuration identifier while the motor vehicle continues to be operated, wherein the configuration bus message, apart from the configuration identifier, contains no information for outputting to an output device of the motor vehicle and/or for controlling the at least one motor vehicle bus module.

2. The coupling control module according to claim 1, wherein the configuration identifier is provided for the at least one motor vehicle bus module to evaluate control bus messages and/or signal bus messages from the coupling control module and/or so that the at least one motor vehicle bus module is enabled and/or ready for communication with the coupling control module and/or so that the at least one motor vehicle bus module, in a function as a gateway, forwards these to at least one further motor vehicle bus module or vehicle control module connected to the motor vehicle bus module.

3. The coupling control module according to claim 1, wherein the control bus messages and/or signal bus messages contain at least one usage information, which signals a use of the trailer coupling by a trailer coupled to the motor vehicle.

4. The coupling control module according to claim 1, wherein said coupling control module is configured to receive a configuration information bus message from the at least one motor vehicle bus module; wherein the configuration information bus message contains information as to whether the configuration identifier is contained in the configuration data of the at least one motor vehicle bus module.

5. The coupling control module according to claim 1, wherein the coupling control module sends the configuration bus message to the at least one motor vehicle bus module depending on whether the configuration identifier is included in its configuration data.

6. The coupling control module according to claim 1, wherein said coupling control module is configured to send a query bus message via the digital bus of the motor vehicle, with which the coupling control module queries the configuration information bus message in the at least one motor vehicle bus module and/or a plurality of motor vehicle bus modules connected to the bus.

7. The coupling control module according to claim 1, wherein said coupling control module is configured to send the configuration bus message only after querying and/or reception of the configuration information bus message from the at least motor vehicle bus module.

8. The coupling control module according to claim 1, wherein said coupling control module is configured for transmitting the configuration bus message as a function of at least one temporal condition, and/or as a function of at least one trigger event and/or a first power supply of the coupling control module and/or an actuation of a brake of the motor vehicle and/or a switching of at least one lamp of the motor vehicle or the trailer and/or an electrical trigger signal and/or a trigger bus message, and or as a function of a predetermined switching sequence or operating sequence of an electrical functional element.

9. The coupling control module according to claim 8, wherein said coupling control module has at least one manually operable electrical operating switch for generating the trigger signal or trigger event.

10. The coupling control module according to claim 1, wherein said coupling control module is configured for connection to an onboard diagnostic interface of the motor vehicle and/or has an interface for connection to an onboard diagnostic interface.

11. The coupling control module according to claim 1, wherein said coupling control module has a parameterisation interface for parameterising the configuration identifier and/or the at least one motor vehicle bus module has identifying data and/or data relevant to and standing in connection with the transmission of the configuration identifier.

12. The coupling control module according to claim 1, wherein said coupling control module is configured to send switching information to the at least one motor vehicle bus module, wherein the motor vehicle bus module is capable of being switched to a parameterisation mode by the switching information, in which mode the motor vehicle bus module is enabled to parameterise the configuration identifier.

13. The coupling control module according to claim 1, wherein said coupling control module is configured to send at least one acceptance information for authentication and/or identification in the at least one motor vehicle bus module, wherein the motor vehicle bus module accepts the configuration identifier as a function of the acceptance information into its configuration data.

14. The coupling control module according to claim 1, wherein said coupling control module has coupling means or an interface for coupling a trailer socket, which is provided for plugging a connector of the trailer, to the vehicle electrical system of the motor vehicle and/or control device or an interface for controlling at least one electric drive for fixing the trailer coupling in at least one operating position, and/or a drive for adjusting a coupling arm of the trailer coupling between a use position provided for attaching the trailer and a non-use position provided when the coupling arm is not in use.

15. The coupling control module according to claim 1, wherein said coupling control module has an output device outputting a message until the output device has sent the configuration identifier to the at least one motor vehicle bus module after a first start-up and/or that it is configured for determining that at least one motor vehicle bus module of the motor vehicle has not received the configuration identifier, by monitoring a bus communication to the bus of the motor vehicle.

16. The coupling control module according to claim 1, wherein the configuration identifier contains or is formed by a parameterisation "trailer operation" and/or "coupling control module connected to the digital bus" and/or in that the configuration identifier declares or defines the presence of the motor vehicle bus module and/or the trailer coupling or both with the at least one motor vehicle bus module.

17. The coupling control module according to claim 1, wherein the configuration bus message is provided and/or configured to set the at least one motor vehicle bus module to trailer operation and/or communication with the coupling control module.

18. A method for integrating a coupling control module of a trailer coupling into a vehicle electrical system of a motor vehicle, wherein a trailer is configured to be attached to the motor vehicle by the trailer coupling, wherein the coupling control module controls and/or monitors at least one electrical function of the trailer coupling, wherein the coupling control module has a bus interface for connection to a digital bus of the vehicle electrical system of the motor vehicle, wherein the coupling control module is capable sending bus messages via the bus interface to at least one motor vehicle bus module of the motor vehicle connected to the bus and is capable of receiving bus messages from the at least one motor vehicle bus module, wherein sending at least one configuration bus message to the at least one motor vehicle bus module via the bus interface through the coupling control module, wherein the configuration bus message contains a configuration identifier to be entered into configuration data of the motor vehicle bus module, wherein the configuration identifier is provided for enabling the at least one motor vehicle bus module to carry out at least one function depending on the presence of the trailer coupling and/or depending on bus messages received from the coupling control module by the received configuration identifier while the motor vehicle continues to be operated, wherein said coupling control module is configured to send switching information to the at least one motor vehicle bus module, wherein the motor vehicle bus module is capable of being switched to a parameterisation mode by the switching information, in which mode the motor vehicle bus module is enabled to parameterise the configuration identifier.

19. A computer program product comprising a non-transitory computer program code for performing the method according to claim 18, wherein the computer program is loaded into a computer and/or a coupling control module and executed by the computer or a processor of the coupling control module.

20. A coupling control module for a trailer coupling for connection to a vehicle electrical system of a motor vehicle, wherein a trailer is capable of being coupled to the motor vehicle by the trailer coupling, wherein the coupling control module actuates and/or monitors at least one electrical function of the trailer coupling, wherein the coupling control module comprises a bus interface for connection to a digital bus of the vehicle electrical system of the motor vehicle, wherein the coupling control module is capable of sending bus messages via the bus interface to at least one motor vehicle bus module of the motor vehicle connected to the digital bus and is capable of receiving bus messages from at least one motor vehicle bus module, wherein the coupling control module is configured for sending at least one configuration bus message to the at least one motor vehicle bus module via the bus interface, wherein the configuration bus message contains a configuration identifier to be entered into configuration data of the motor vehicle bus module, wherein the configuration identifier is provided for enabling the at least one motor vehicle bus module to carry out at least one function depending on the presence of the trailer coupling and/or depending on bus messages received from the coupling control module by the received configuration identifier while the motor vehicle continues to be operated, wherein said coupling control module is configured to send switching information to the at least one motor vehicle bus module, wherein the motor vehicle bus module is capable of being switched to a parameterisation mode by the switching information, in which mode the motor vehicle bus module is enabled to parameterise the configuration identifier.

21. A coupling control module for a trailer coupling for connection to a vehicle electrical system of a motor vehicle, wherein a trailer is capable of being coupled to the motor vehicle by the trailer coupling, wherein the coupling control module actuates and/or monitors at least one electrical function of the trailer coupling, wherein the coupling control module comprises a bus interface for connection to a digital bus of the vehicle electrical system of the motor vehicle, wherein the coupling control module is capable of sending bus messages via the bus interface to at least one motor vehicle bus module of the motor vehicle connected to the digital bus and is capable of receiving bus messages from at least one motor vehicle bus module, wherein the coupling control module is configured for sending at least one configuration bus message to the at least one motor vehicle bus module via the bus interface, wherein the configuration bus message contains a configuration identifier to be entered into configuration data of the motor vehicle bus module, wherein the configuration identifier is provided for enabling the at least one motor vehicle bus module to carry out at least one function depending on the presence of the trailer coupling and/or depending on bus messages received from the coupling control module by the received configuration identifier while the motor vehicle continues to be operated, wherein the configuration identifier contains or is formed by a parameterisation "trailer operation" and/or "coupling control module connected to the digital bus" and/or in that the configuration identifier declares or defines the presence of the motor vehicle bus module and/or the trailer coupling or both with the at least one motor vehicle bus module.

\* \* \* \* \*